April 26, 1938.  F. T. POWERS  2,115,233
PROCESS CAMERA
Filed July 5, 1935   2 Sheets-Sheet 1

INVENTOR
Frank T. Powers
BY Morgan, Finnegan & Durham
ATTORNEYS

April 26, 1938.  F. T. POWERS  2,115,233
PROCESS CAMERA
Filed July 5, 1935   2 Sheets-Sheet 2

INVENTOR
Frank T. Powers
BY
Morgan Finnegan & Durham
ATTORNEYS

Patented Apr. 26, 1938

2,115,233

UNITED STATES PATENT OFFICE 2,115,233

PROCESS CAMERA

Frank T. Powers, Douglaston, N. Y.

Application July 5, 1935, Serial No. 29,830

3 Claims. (Cl. 95—81)

The invention relates to new and useful improvements in process cameras and more particularly to novel and useful mechanisms for selectively producing different kinds of process negatives.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, constructions, arrangements, combinations and improvements herein shown and described.

The accompanying drawings, referred to herein and constituting a part hereof, illustrate one embodiment of the invention, and together with the description, serve to explain the principles of the invention.

An object of the invention is to provide a camera having wide adaptability in doing process work, and capacitated to pass practically instantaneously from one kind of process work to another, as from half-tone work to line work, or vice versa, and adapted to be changed back and forth from one type of process to another with a minimum of delay, handling or adjustment; and among further objects the invention provides a camera capacitated to make successive half-tone and line negatives, or successive exposures for composite half-tone and line negatives without change of focus or like adjustment in the camera. The invention provides further a camera having the instrumentalities for doing the widely varied kinds of work indicated inclosed and incorporated in a unit or integral camera mechanism, together with devices for effecting sequential or alternative operation or utilization of the various devices, together with means for locking certain devices out of operation when other devices are in use.

In realizing the objects of invention stated, together with other objects, as at present preferably embodied, means are provided for presenting at the focal plane of the camera a light-sensitive material for making process negatives, together with a plurality of carriers, each capacitated to carry a glass plate of widely varying size, one or more of the glass plates being half-tone screens, together with means for alternatively presenting one or another of the carriers with its plate in the image field in front of the positioned light-sensitive material. In making successive half-tone and line negatives, or composite half-tone and line negatives, one of the carriers will have a half-tone screen, and the other carrier will have a clear glass plate of the same thickness and refracting index as the screen, the use of these obviating the necessity of altering the focal adjustment of the lens in changing back and forth between making half-tone negatives and line negatives. In cooperation with the foregoing, means are provided for moving a presented screen toward and from the light-sensitive surface to get the exact separation, as required by the different screen meshes. Devices are likewise provided for locking one carrier mechanism from movement while another carrier mechanism is moving to or from the image field and while its screen or plate is presented in the field.

It will be understood that the foregoing general description, and the appended detailed description as well are exemplary and explanatory, but are not restrictive of the invention.

Figure 1:
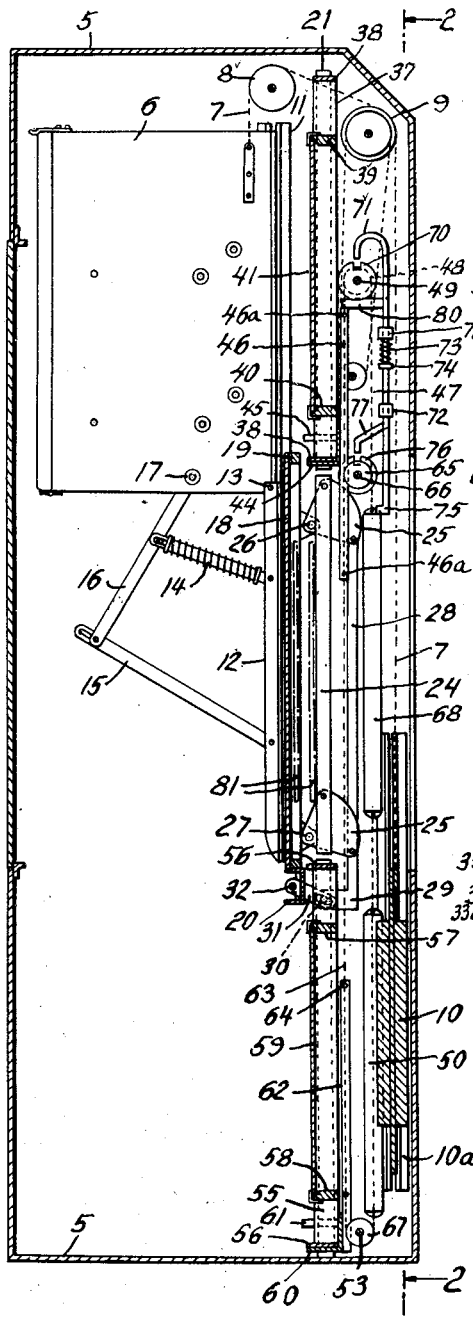
Fig. 1 is a vertical sectional view of a camera embodying the invention, and is taken on line 1—1 of Fig. 2.
Figure 2:
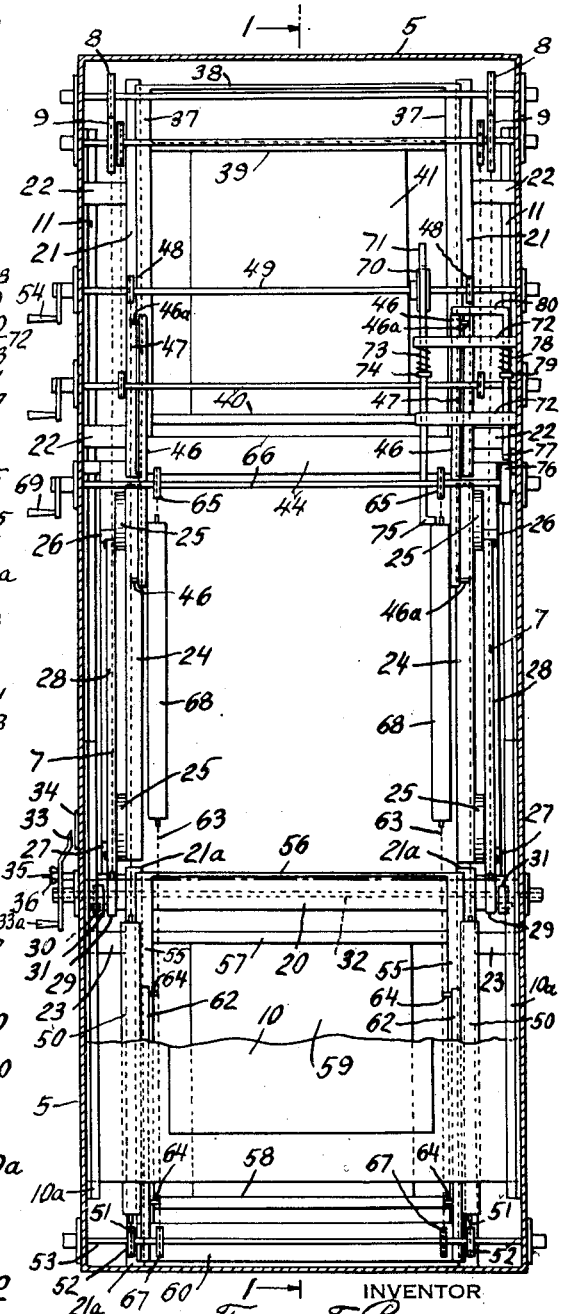
Fig. 2 is a similar view taken on line 2—2 of Fig. 1.

Referring now in detail to the embodiment of the invention illustrated by way of example in the accompanying drawings, a light-tight camera box or casing 5 is shown of size and shape to enclose all the various cooperating mechanisms as previously outlined. The light-sensitive material employed for the process negatives may be of any desired kind or description, so far as concerns the present invention, and the means for presenting the selected light-sensitive material may be similarly varied as well. It will usually or often be found convenient, efficient and economical to employ means capacitated to present the light-sensitive material dispensed from a roll, in pieces or parts of the approximate size desired for a particular negative size, which may be cut off from the roll, giving a negative of the desired size with minimum or no wastage. As shown (Figs. 1 and 2), a mechanism for presenting strip films of various widths and of a selected length at the place of exposure is contained within a box 6, this mechanism including a plurality of rolls, of different widths of light-sensitive material such as photographic paper or strip film. The box 6 is slidably mounted on guides 11 carried by the camera casing, and is suspended on chains 7, which pass over sprockets 8 and 9, counterweights 10 being attached to the other ends of the chains 7. The counterweights 10 are slidable in guides 10a likewise fixed to the camera casing. A glass plate 18 in the image field and in the focal plane is attached to a frame 19 which is supported from the sides of the camera by the channels 20. The sensitized strip from a roll of the desired width is presented of a selected length for exposure just behind the plate 18, and means for pressing the light-sensitive material against the plate 18 comprises a presser board 12, pivotally supported at 13, and moved about its pivotal support by means of links 14 and 15 pivoted thereto and to arms 16 which are keyed on a shaft 17, which shaft is operable from without the camera by means not shown in the drawings. The mechanism just described is the same or substantially similar to that shown in either of my Patents No. 1,832,656, issued November 17, 1931, or No. 1,909,424, issued May 16, 1933, and need not be here further described in detail.

The embodied means for selectively and alternatively presenting any one of a plurality of screens or glass plates in the image field in front of the light-sensitive material comprises screen or plate carriers, and a sectional trackway upon which these move to and from the image field. The trackway as embodied comprises an upper section having rails 21, supported in fixed position by blocks 22 fixed to the sides of the camera 5. The trackway comprises also a lower section having rails 21a, supported by blocks 23 fixed to the sides of the camera, and these rails are attached at their lower ends to the bottom of the camera casing. The intermediate section of the trackway, between the aforesaid upper and lower sections, comprises rails 24, the three sections constituting a continuous trackway.

Figure 5:
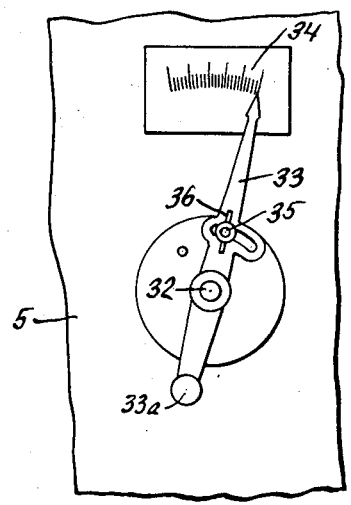
Fig. 5 is a fragmentary detail of the screen adjusting means.

Means are provided (Figs. 1 and 2) for moving the track section 24 toward and away from the focal plane, so that a screen and its carrier on this track section may be properly positioned with respect to the light sensitive surface to give the exact separation required for the mesh of the particular screen being used. In the embodied form of this means, the rails 24 are pivotally attached at their upper and lower ends to four quadrants 25, the upper quadrants being pivotally mounted respectively on studs 26, and the lower quadrants being similarly mounted on studs 27, the upper and lower quadrants at either side being connected together by links 28. The illustrated means for effecting the movement just described comprises angled pieces or links 29, pivotally connected to the two lower quadrants 25, the pieces 29 having at their lower ends pins 30, which project into slots in the ends of arms 31, which arms are fixed on a shaft 32, journaled in the camera casing, and projecting therefrom at one side. The projecting portion of shaft 32 has a handle and a pointer 33 (Figs. 1, 2 and 5), conveniently provided with a handle 33a at one end. A scale 34 on the outside of the casing cooperates with the pointer 33 to give the proper distance set to the half-tone screen, and the threaded pin 35 in the slot in pointer 33 and nut 36 provide means for locking the screen in the proper position.

Figure 3:
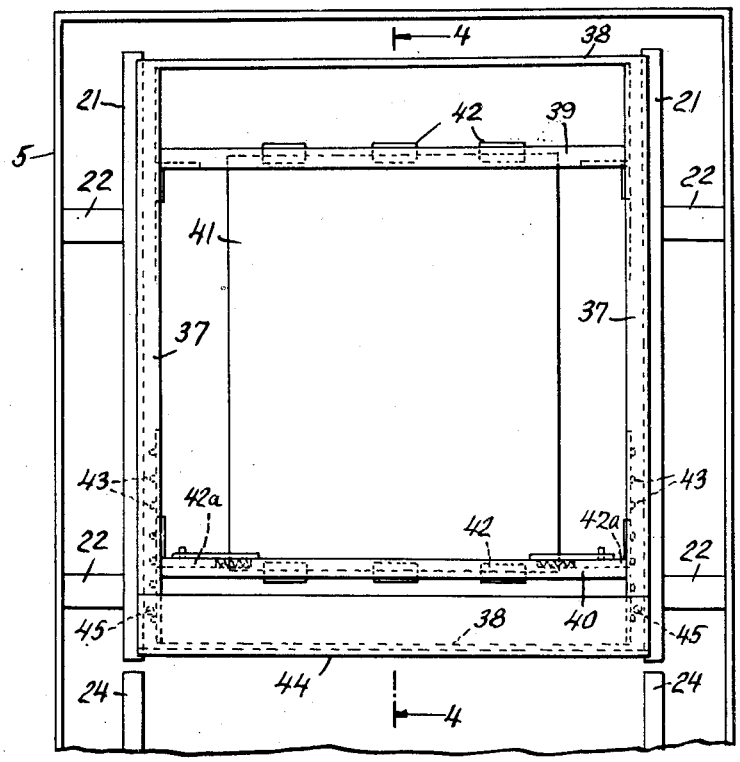
Fig. 3 is a detail of one of the travelable screen carriers.
Figure 4:
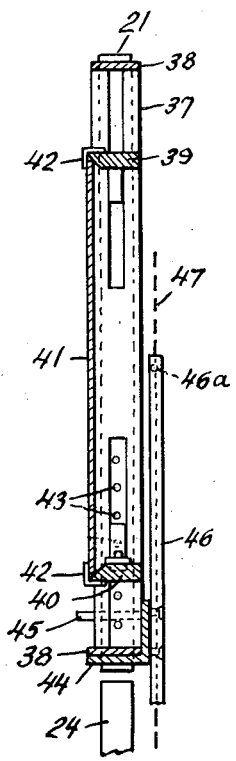
Fig. 4 is a section taken on line 4—4 of Fig. 3.

In the present embodiment two carriers for half-tone screens or glass plates are employed, and these are mounted at either end of the trackway, and are alternatively movable onto the median section 24 of the track to bring the screen or plate of the selected carrier into the image field in front of the light-sensitive material. Each of these carriers is capacitated to carry screens or plates varying widely in size. While these are designated screen carriers for brevity, it will be understood that each carrier will carry either a screen or a glass plate, usable, for instance, to obviate the need of refocusing between half tone and line negative exposures. Figs. 3 and 4 show details of the upper screen carrier, which comprises side bars 37 which are connected together at their top and bottom ends by cross bars 38. Side bars 37 are grooved to engage and slide along the rails 21 of the trackway previously described, to guide the carrier to and fro between the image field and its retracted position. Within this carrier frame are the devices for holding the screens or plates of different sizes. Two movable cross bars 39 and 40 are mounted in the carrier frame and are movable toward and from each other to accommodate glass plates of different lengths, such a plate being indicated by 41 and the plate may be either plain or may carry a half-tone screen figure. The plate 41 is held in place by metal clips 42, engaging the plate and fixed to the cross bars 39 and 40. Means for adjusting or varying the position of the cross bar 40 comprises spring-controlled movable pins 42a, mounted in the bar 40 near either end thereof, these pins being adapted to pass into spaced-apart holes 43 formed in the side bars 37 to thereby variably position the cross bar 40. The ends of the upper cross bar 39 project into slots in the vertical frame members 37, are freely movable in the slots, and rest by gravity on the top of the plate 41. The entire carrier structure just described is supported upon a horizontally disposed seat comprising an angle 44, upon which the lower cross frame 38 of the screen carrier is seated. Pins 45 are fixed to the vertical reach of the angle 44, and extend through holes in the cross frame member 38, and thereby the entire carrier is held to its seat on the angle 44, but is permitted to move in and out a short distance along the pins 45. This movement is utilized in positioning the screen to get the proper separation from the light-sensitive material for the particular mesh used.

Referring now to the embodied means for traveling the upper plate carrier from its retracted or inactive position on track section 21 to operative position in the image field on track section 24 (Figs. 1, 2 and 4), the angled seat 44 is rigidly attached near both its ends to bars 46, which bars are attached by studs 46a at their top ends to chains 47, which chains pass over sprockets 48, fixed on shaft 49, the chains then extend downwardly and are attached at their other ends to counterweights 50. Attached to the lower ends of counterweights 50 are chains 51, which pass over sprockets 67, loose on shaft 53, journaled near the bottom of the casing. The chains then pass upwardly and are attached to the lower ends of the bars 46, which are fixed to the seat 44 as already described. Shaft 49 extends outside the camera casing and is provided with a crank handle 54, and by rotation of the shaft, the screen carrier may be raised and lowered along the track sections 21 and 24 between its operative and retracted positions.

present a screen in the image field, and the other carrier may present a glass plate of the same refractive index and thickness as the screen, thereby avoiding the annoyance and time loss which would be involved in changing the focus.

Means are provided by the invention for preventing movement of either screen carrier into the image field except when the intermediate section 24 of the trackway is in alinement with the sections 21 and 21a. That is, neither screen carrier can be advanced into the image field except when the central section 24 of the trackway is in alinement to receive it and thereafter to move the screen toward and away from the focal plane. In the embodied form of said means, the horizontal reach 44 of the frame of the upper screen carrier will engage with the top ends of the guides 24 when they are not in alinement with the track sections 21. In like manner the upper horizontal bar 56 of the frame of the lower screen carrier will engage with the bottom end of the guides 24 when they are out of alinement with the track section 21a. There is thus provided by the invention cooperating devices which prevent either screen carrier being advanced into the image field except when the other is in retracted position and which will prevent either screen carrier being advanced into the image field except when the central section 24 of the trackway is in alinement with the particular end section of the trackway to receive the screen carrier.

The invention in its broader aspects is not limited to the specific mechanisms shown and described but departures may be made therefrom within the scope of the accompanying claims without departing from the principles of the invention and without sacrificing its chief advantages.

What I claim is:

1. A process camera including in combination means for presenting light-sensitive material in the focal plane of the camera, a trackway extending across the field in front of the presented light-sensitive material, screen carriers on said trackway at either side of the field, and means for alternatively moving either screen carrier along the trackway to present the carrier and its screen in the image field in front of said light-sensitive material, and means for locking a screen carrier from movement along the track toward the image field until the other screen carrier is in retracted position on the track.

2. A process camera including in combination means for presenting light-sensitive material in the focal plane of the camera, a sectional trackway extending across the image field in front of the presented light-sensitive material, screen carriers on said trackway at either side of the field, means for alternatively moving either screen carrier along the trackway to present the carrier and its screen in the image field in front of said light-sensitive material, means for moving a section of the trackway located in the field and a screen carrier and screen thereon toward and away from the light sensitive material and means preventing movement of one screen carrier toward the image field until the other carrier is in its fully retracted position.

3. A process camera including in combination means for presenting light sensitive material in the focal plane of the camera, a trackway extending across the image field in front of the focal plane, said trackway having a portion movable along the axis of the camera and a portion at each side of the image field, screen carriers mounted at either side of the field on said trackway, means for moving the axially movable portion of the trackway to focus a screen supported thereon and means for alternatively moving either screen into operative position on said axially movable trackway portion.

FRANK T. POWERS.

Suitable stops, not shown, may be used to limit the upward motion of the screen carrier.

The lower screen carrier may be of the same or similar construction, and is adapted to move on track sections 21a and 24 between retracted and operative positions. This carrier is likewise capacitated to take screens or plates of widely varying size. It comprises side bars 55 connected together by top and bottom cross bars 56. Side bars 55 are grooved to slide on the trackway rails 21 and 24, to guide the carrier between retracted and operative positions. Within this frame are the devices for holding screens or plates of various sizes, which devices comprise movable cross bars 57 and 58. These are adjustable to engage glass plates or screens 59 of varying sizes, and to hold them in position. The further details of said means may be the same as or similar to those shown and described in connection with the upper screen carrier.

The embodied form of means for traveling said lower screen carrier between the image field and its retracted position comprises an angled, horizontally disposed seat 60, similar to the seat 44 previously described. Pins 61 fixed in the vertical reach of the angle 60 project through holes in the bars 55, to permit the movement of the carrier toward and from the light-sensitive material to get the proper separation for any particular screen mesh. Fixed to the angle 60, near either end, are bars 62, to the both ends of which bars are attached chains 63 by means of studs 64. These chains pass over sprockets 65, fixed on the shaft 66, journaled in the camera casing, and over sprockets 67, which are loosely mounted on shaft 53, the ends of the chains 63 being attached to the upper and lower ends of counterweights 68. Shaft 66 has one end extending from the camera casing, and fixed thereto is a crank 69 by means of which the screen carrier is moved to and fro between operative and retracted positions along the trackway. Suitable stops, not shown, may be used to fix the lower limit of travel of the screen carriers.

Means are provided for insuring the alternative presentation of the screen carriers and their screens in the image field, and the embodied form comprises locking devices to engage the traveling means for the respective screen carriers so that neither traveling means can be operated to move its screen carrier into the field unless the other screen carrier is out of the field and preferably in full retracted position. The embodied locking means for the upper screen carrier comprises a notched disc 70 keyed to shaft 49 (which is part of the means for traveling the upper screen carrier) and the disc 70 is in such position relative to the sprockets 48 that its notch will be vertically above the shaft 49 only when the upper screen carrier is retracted, and preferably is in its extreme uppermost position. Arranged just above and in alinement to engage with this notch is a hooked rod 71, which is longitudinally slidable in bearing blocks 72, fixed to the camera casing. A compression spring 73 coiled about rod 71 is in compression between a collar 74 on the rod and the upper bearing block 72, and presses the rod 71 downwardly and tends to move it so that it will engage with the notch in the disc 70. The lower end of rod 71 has a transversely projecting lug 75, adapted to engage the upper surface of counterweight 68 when the latter is in the position corresponding to the location of the lower screen carrier when nearly at the end of its retracted travel, and the subsequent slight upward movement of the counterweight 68 will lift the end of rod 71 out of the notch in disc 70, and permit shaft 49 to be rotated thereby to advance the upper screen carrier from retracted position into the image field. Thus in the embodied mechanism the upper screen carrier is locked against movement except when the lower screen carrier is in its utmost retracted position.

Referring now to the embodied means for controlling operation of the lower screen carrier, a notched disc 76 is keyed on shaft 66 (which is a part of the mechanism for moving the lower screen carrier to and fro between the image field and its retracted position), the notch being in such position that it is vertically above shaft 66 only when the lower screen carrier is in full retracted position. An offset rod 77 is slidably mounted in the bearing blocks 72, and a spring 78 is coiled about rod 77 in compression between a block 72 and collar 79, fixed on the rod. Rod 77 at its upper end has a laterally extending arm or bend 80 adapted to engage with the top of one of the bars 46 when the latter, traveling with the upper screen carrier to which it is fixed, is almost in its uppermost position. Further upward movement of the screen carrier and bar 46 to bring the screen carrier to its extreme retracted position will lift the rod 77 out of the notch in disc 76, thereby permitting rotation of shaft 66 which actuates the mechanism for bringing the lower screen carrier into the image field. Thus in the present embodiment neither screen carrier can be moved except when the other is in its extreme retracted position at the top or bottom of the casing, which effectively prevents improper operation.

As previously described, the light sensitive material of a selected size is presented in the field and focal plane, behind the glass plate 18, and is pressed against the plate by the member 12. Either screen carrier may be traveled from its retracted position on the track sections 21 or 21a onto track section 24, and thereby is brought into the field. The other screen carrier is immediately locked against movement and is not released for movement until the first mentioned carrier is returned to its retracted position. When a half-tone screen is presented on its carrier before the light-sensitive material, the screen may be moved toward the glass plate 18 and accurately brought to the desired distance from the light-sensitive material as indicated by the position of the pointer 33 on the scale 34. This movement is effected by rotation of the handle of pointer 33 and of shaft 32. Slotted arms 31 raise links 28 and synchronously rotate the four quadrants 25, to which the rails 24 are pivotally connected, and the rails, the screen carrier and screen are moved accurately into the desired position for the particular screen mesh, before the glass plate 18. This movement of the upper screen carrier relatively to its traveling mechanism is effected by the carrier sliding on the upper surface of the angled support 44, in which movement it is guided by the pin 45. The lower screen carrier in like manner slides on the angled support 60, in which movement it is guided by the pins 61. The dotted outlines of a screen in its two extreme positions are shown at 81 in Fig. 1. Thus any desired screen separation may be set within the limits of the mechanism, which is so designed that any screen separation used in the art may be obtained. When composite half-tone and line negatives are to be made, or successive half-tone and line negatives are to be made, one carrier may